United States Patent [19]

Hervé et al.

[11] Patent Number: 5,165,520

[45] Date of Patent: Nov. 24, 1992

[54] DEVICE FOR CONTROLLING AND REGULARISING THE SPACING OBJECTS SUCH AS PARCELS, PACKAGES

[75] Inventors: Oiry Hervé; Nicotra Hervé; Elisabeth Capitaine, all of Nante; Dominique Barba, Carquefou; Christian Viard-Gaudin, Nantes, all of France

[73] Assignee: La Poste, Paris, France

[21] Appl. No.: 753,879

[22] Filed: Sep. 3, 1991

[30] Foreign Application Priority Data

Sep. 4, 1990 [FR] France ............................... 90 10968

[51] Int. Cl.$^5$ ............................................. B65G 43/00
[52] U.S. Cl. .................................... 198/460; 198/444; 198/396; 198/372
[58] Field of Search ............... 198/443, 444, 460, 461, 198/367, 372, 580, DIG. 954, 358

[56] References Cited

U.S. PATENT DOCUMENTS

| | | | |
|---|---|---|---|
| 4,214,663 | 7/1980 | Schopp et al. | 198/372 X |
| 4,256,216 | 3/1981 | Winters et al. | 198/372 X |
| 4,476,981 | 10/1984 | Yoshida | 198/372 X |
| 4,819,784 | 4/1989 | Sticht | 198/396 X |
| 4,838,435 | 6/1989 | Alexandre et al. | 198/396 X |
| 4,850,471 | 7/1989 | Annas, Sr. et al. | 198/372 X |
| 4,984,678 | 1/1991 | Fauchard | 198/443 |
| 5,029,693 | 7/1991 | Williams | 198/372 |

FOREIGN PATENT DOCUMENTS

| | | |
|---|---|---|
| 0118593 | 9/1984 | European Pat. Off. . |
| 0320391 | 6/1989 | European Pat. Off. . |
| 0366857 | 5/1990 | European Pat. Off. . |
| 0383673 | 8/1990 | European Pat. Off. . |
| 2167211 | 5/1986 | United Kingdom . |

Primary Examiner—Robert P. Olszewski
Assistant Examiner—James R. Bridwell
Attorney, Agent, or Firm—Pollock, VandeSande & Priddy

[57] ABSTRACT

Device for controlling and regulating the spacing of parcels, packages or similar objects and, more particularly, of postal parcels, mounted at the outlet of a separation apparatus that includes a truncated cone-shaped rotating drum with its axis inclined towards the horizontal and having internal helical fins designed to deliver the packages one by one to the outlet of the drum. The device further includes a conveyor belt driven at constant speed and onto which the packages are tipped at the outlet of the drum, a barrier of detection cells, the beam of which extends in perpendicular to the line of travel of the conveyor in order to identify the moment of each package's passage into this beam and to measure, between two successive interruptions of the cells, the relative spacing of two consecutive packages intersecting, each in turn, the beam of the cells. The device further includes at least one instantaneous photographic camera to obtain an image illustrating the distribution in real time of the packages on the conveyor, a digital-processing circuit to process the image supplied by the camera to identfy any superimposition or juxtaposition of two packages which have escaped detection by the cells, and a deviator mechanism actuated by the processing circuit to remove from the conveyor those packages which are not suitably spaced.

6 Claims, 2 Drawing Sheets

DEVICE FOR CONTROLLING AND REGULARISING THE SPACING OBJECTS SUCH AS PARCELS, PACKAGES

FIELD OF THE INVENTION

The present invention relates to a device for controlling and regularizing the spacing of parcels, packages or similar objects on a conveyor or moving table, applying more particularly in the case of postal parcels, prior to any processing of these, consisting notably of indexation, stamping and final sorting according to their destinations.

BACKGROUND OF THE INVENTION

Through patent application No. 89.01981 of Feb. 15, 1989, a device is already known for the separation and alignment of objects, more particularly of parcels or packages in a postal sorting installation, comprising means of conveyance for these packages brought in bulk to the entrance of the device and the discharge of these same packages, separated and aligned, at the outlet. This device comprises, notably, at least one drum in the form of a truncated cone, open at its extremities, continuously driven in rotation about its axis disposed inclined towards the horizontal, and which comprises, within its internal area, a set of helical fins, axially offset one in relation to the other and together extending over at least one complete revolution of the truncated cone, the packages introduced at the upper extremity of smaller diameter at the entrance of the truncated cone being discharged at its lower extremity of larger diameter at its outlet.

With this device, although the distribution of the packages is generally satisfactory, situations can nevertheless arise in which the separation, i.e. the spacing, of these packages, is insufficient, particularly when some packages overlap or are not separated from one another by a sufficient spacing to allow a package to be processed before the following one appears, in turn, at the indexation bay.

BRIEF DESCRIPTION OF THE INVENTION

The subject of the present invention is a device provided to control the spacing of packages on a moving table, with a view to the subsequent processing of these packages within a suitable indexation and sorting installation.

According to the invention, the envisaged device, mounted at the outlet of a separation aggregate comprising, preferentially, a truncated cone-shaped rotating drum with its axis inclined towards the horizontal and comprising internal helical fins designed to deliver the packages one by one to the outlet of the drum, is characterized in that it comprises a conveyor belt driven at constant speed and onto which the packages are tipped at the outlet of the drum, a barrier of detection cells, the beam of which extends, according to a perpendicular direction, in the line of travel of the conveyor in order to identify the moment of each package's passage into this beam and to measure, between two successive occultations of the cells, the relative spacing of two consecutive packages intersecting, each in turn, the beam of the cells, at least one instantaneous photographic camera in order to provide an image illustrating the distribution in real time of the packages on the conveyor, a digital-processing circuit for the image supplied by the camera in order to identify any superimposition or juxtaposition of two packages which have escaped detection by the cells, and a deviator mechanism actuated by the processing circuit in order to remove from the conveyor those packages which are not suitably spaced.

Preferentially, the detection cells are made up of infrared cells disposed in a curtain arrangement beneath the conveyor belt over a width such that the emitted beam will necessarily encounter the packages tipped onto the conveyor, whatever might be the position of these packages and their possible overlapping.

According to another characteristic, the photographic camera is a so-called CCD camera, having a charge-transfer component matrix, transmitting an analog video signal, capable of giving an image representing the silhouette of the packages which is projected onto the plane of the conveyor, this image being analyzed by the digital-processing circuit. Advantageously, the device comprises two cameras, the angles of recording of which are different, in order to improve the device's discrimination capability. Preferentially, the cameras used are designed to provide 256×256 digital images, at 8 bits per pixel, from suitably contrasted video images.

The digital-processing circuit is provided such that, from contours of the packages and their silhouettes extracted from images supplied by the camera, it analyzes the convexity of these silhouettes in order to draw therefrom, as the case may be, an order of command for the deviator mechanism, depending upon the good or poor separation of the objects. More particularly, in the event of the analysis of the image leading to the detection of a non-convex shape, resulting from the superimposition or overlapping of two or more packages, or in the case of several convex silhouettes resulting from packages becoming juxtaposed, the processing circuit draws up an order of command such that the packages which have thus been poorly separated on the conveyor belt will be removed from the conveyor by the deviator mechanism and subsequently recycled.

It has been found in fact that postal parcels exhibit, as a most general rule, a mass of cylindrical or more often still parallelepipedal shape, these common convex shapes representing more than 96% of the volume processed in an ordinary sorting installation.

It has also been found that the projection onto any plane whatsoever of an object of convex shape will necessarily give rise to a silhouette which is itself convex. From there, the identification within the image of the examined object of a profile presenting a concavity will be legitimately interpreted as a situation resulting from a poor separation of the packages on the conveyor belt and, in particular, from the superimposition of several packages.

Nevertheless, the existence of a convex silhouette does not systematically reveal the presence of a single package, particularly where two packages are for example superimposed, the apparent contour of the one being entirely contained within that of the other of substantially greater dimensions. It can be concluded from this that, although the use of at least two cameras improves the device's discrimination capability, the checking of an image originating from a camera is not in itself sufficient to lead to a correct result in all cases and that a more in-depth analysis is essential.

More particularly, the digital-processing circuit used with the device according to the invention enables an interpretation to be made of the contours of the image supplied by the camera, preferentially through the two cameras producing photographs from different angles. This enables not only the identification of the silhouettes presenting a significant non-convexity, but also the determination, in a convex silhouette, of whether this latter corresponds to a situation of correct separation or, conversely, to a superimposition of packages in a particular configuration, not distorted in this case by a concavity of the contour. Of course, the processing circuit is also set up such that slight non-convexities, corresponding to slight deformations of the packages, are not regarded as significant.

Advantageously, the processing circuit effects, within the image supplied by the camera, a detection of the object's contours, followed by an extraction of its silhouette and then a polygonal approximation, before proceeding on the strength of the latter to a convexity test, the result of this ensures the all or nothing command of the deviation mechanism in order to remove or conversely validate the passage of the processed package towards the following part of the installation.

The detection of the image contours is carried out by a mathematical method, in itself traditional, consisting notably in determining the maxima of the first derivative of the signal of luminance, i.e. the gradient of luminance of this image, or indeed by the localization of the zeros of the second derivative (Laplacian method); it should be noted that in this second case, before applying the Laplace operator, it is generally desirable to subject the image to filtering using a low-pass filter, so as to avoid retrieving too many contour points generated by the noise present in the initial image. With the gradient method, use will preferentially be made of a signal-processing circuit of the convolution type for calculating the gradient of the signal of luminance in the four main directions, in order only to adopt the maximum of these four values and only to retain, as contour points, those for which the gradient thus calculated is above a given threshold.

The obtained binary image is next scanned in search of the first contour point. Then, starting from this point, the silhouette is run through and coded with a particular code, e.g. with the so-called Freeman code. In the course of this stage, it is advisable notably that the circuit should eliminate those parasitic arcs which are likely to alter the silhouette, originating for example from umbra shadows appearing on the image.

The third stage consists then in producing a polygonal approximation of the silhouette according to a two-stage procedure consisting in determining, on the one hand, the essential points of this silhouette and then validating the peaks of the polygon amongst this collection of points, the essential points being those displaying a more pronounced curvature. The validation of the peaks is carried out by means of an iterative algorithm which adopts, as a first approximation, two points from within the preceding collection, then progressively adds peaks in the order corresponding to their significant character, the stop-criterion being the distance of the peak from the approximation chord. Thus, the processing of the image of the silhouette will consist of choosing within this the two most distant essential points, then the point furthest removed from the segment joining the first two points, and similarly the point furthest removed from the segment joining the first point to the fourth and so on, recursively, on the new segments which materialize as the selection of the essential points progresses. It should be noted that, having previously determined all the essential contour points, it is convenient to select a minimum distance separating these points within the polygon, so as to eliminate the slight non-convexities and the effects of the latter.

In a last stage, one proceeds to a test of the convexity of the polygon obtained in the preceding stage, by considering the triplets formed by three consecutive peaks and by determining whether these correspond to a situation of convexity or conversely of non-convexity, the latter case enabling the conclusion of a poor separation to be drawn and consequently removal of the package (or group of packages) by the deviator mechanism.

BRIEF DESCRIPTION OF THE DRAWINGS

Other characteristics of a device for controlling and regularizing the spacing of parcels, packages or similar objects on a moving conveyor will yet become apparent through the following description of an embodiment example, provided on an indicative and non-limiting basis, reference being made to the attached drawings in which.

DETAILED DESCRIPTION OF THE INVENTION

Figure 1:
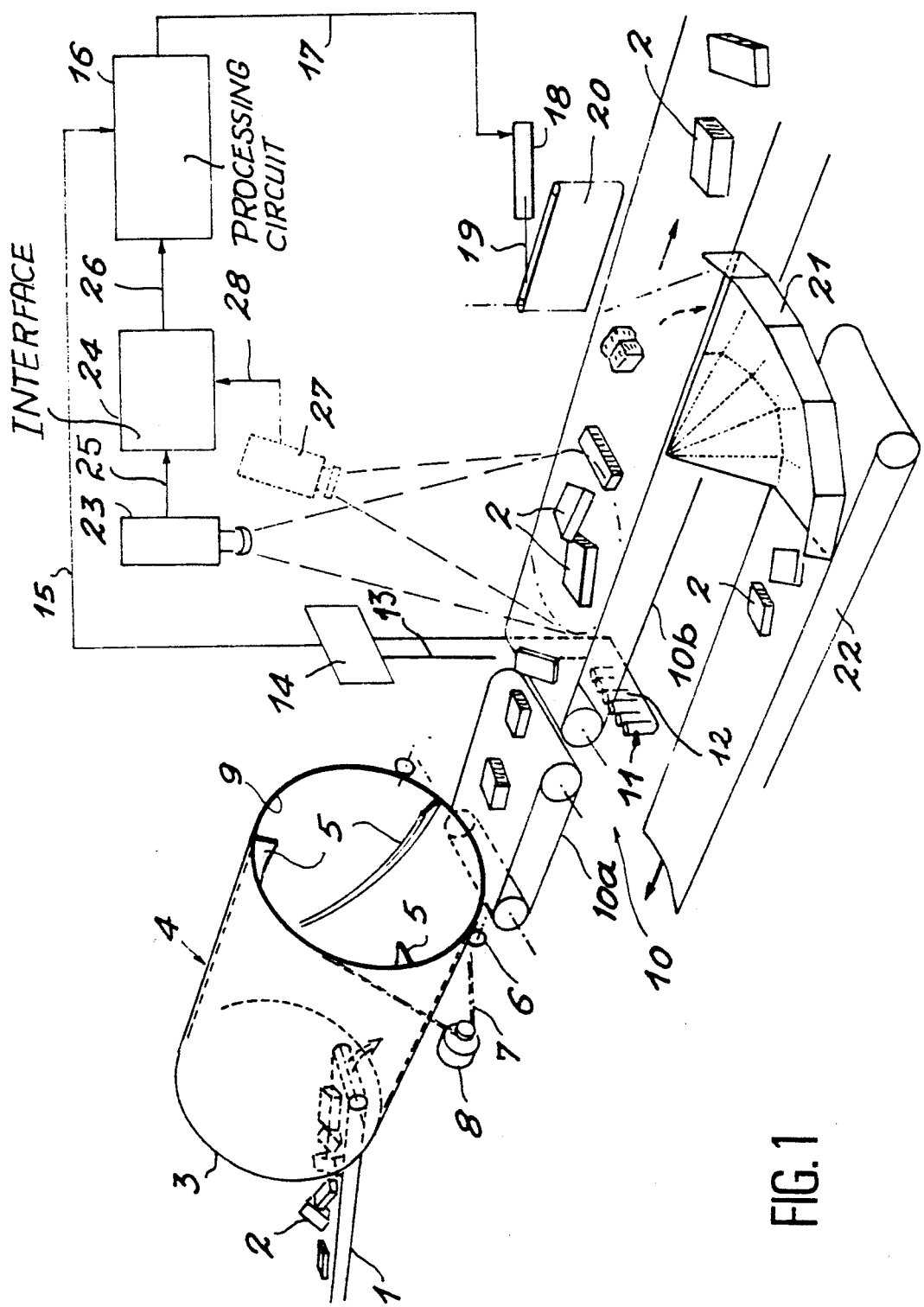
FIG. 1 is a schematic view in perspective of the envisaged device.

On the diagram represented on FIG. 1, reference 1 designates a first conveyor belt, intended to bring packages or similar objects 2, disposed in bulk on this conveyor, up to the entrance 3 of a separation drum 4, the details of the embodiment of which preferentially conform to the provisions forming the subject of application 89.01281 of Feb. 15, 1989 for a device for the separation and alignment of objects. This drum 4 comprises notably a series of internal helical fins such as 5 and presents a profile in the form of a truncated cone, the axis of which is slightly inclined towards the horizontal. The drum is designed to rest on supporting elements 6 arranged such that it is able to turn constantly about its axis, being driven by a belt or chain 7 controlled by a motor 8. The packages 2, tipped out in bulk at the entrance 3 of the drum, are discharged at the drum's outlet 9, this being of larger diameter than the entrance 3, having been subjected in the course of their travel through the drum to a succession of inversions upon themselves thanks to the fins 5, these movements, combined with the effect of gravity owing to the inclination of the drum axis, bringing about a generally sufficient spacing of the packages before they are taken up by a second conveyor belt 10.

Now experience shows that, with this device, situations can still arise in which the packages overlap or are still not separated from one another by a sufficient distance to allow a suitable subsequent processing in the following part of the installation.

As regards, first of all, controlling the distance which separates the successive packages 2 on the conveyor 10, at the outlet of the drum 4 a detecting barrier 11 is used, formed by the assembly, according to the width of the conveyor, of a (or row) of cells 12, generally infrared cells, suitably disposed in a curtain arrangement. In order to allow passage to the beam issuing from these cells, the conveyor 10, in the represented embodiment example, is made up of at least two consecutive conveyors, 10$a$ and 10$b$ respectively, separated by a narrow gap at right-angles to the cells, this gap being sufficiently limited to ensure that the transfer of packages from one conveyor to the other takes place properly and, more particularly, without relative slippage.

The cells 12 are joined by a link 13 to a circuit 14 which transmits a signal through a conductor 15 in the direction of a processing circuit 16, enabling notably control of the instant which separates two successive interruptions of the respective beams by one or several cells by two consecutive packages.

Knowing the drive speed of the conveyor 10, it is possible to calculate automatically the value of the spacing between these packages in order to compare it to a predetermined minimum threshold. If the spacing is above the threshold, then the circuit 16 transmits no signal over an output conductor 17; on the other hand, if the spacing is below the threshold, the circuit 16 commands, for example, the triggering o-f an electric jack 18, the rod 19 of which is articulated on a deviator panel 20, designed to come and place itself across the conveyor 10, with a suitable delay-time corresponding to the time necessary for packages displaying an inadequate spacing to be moved with the conveyor 10 up to the contact of this panel, which then ejects them laterally onto a ramp 21, sending them back, by means of a third conveyor belt 22, towards the entrance of the installation with a view to recycling them with the bulk packages 2, brought by the conveyor 1 up to the separation drum 4. Of course, any other type of deviator mechanism, electrical, electromagnetic or mechanical could be envisaged provided that it realizes, in response to a suitable command order, the ejection from the conveyor of packages which have not been properly separated.

As has already been pointed out, it is nevertheless possible for two packages to overlap or become superimposed at the outlet of the drum, such that, for the barrier 11 of the cells 12, this assembly of two packages does not in fact form more than one image which might be sufficiently distanced from the preceding package for the circuit 16 not to command the ejector panel and hence not to eliminate the two packages in question even though they have been poorly separated.

In order to avoid this drawback, the device comprises a video camera 23, preferentially a CCD camera model having a charge-transfer component matrix, this camera being disposed above the conveyor 10 perpendicular to it, in order to effect a photograph of a scene corresponding at any moment whatsoever to the situation of the packages on the conveyor belt 10 within a determined window of given width. The image supplied by the camera is directed by a link 25, this transmitting, over an output wire 26, a signal routed towards the circuit 16, so as to be able, by virtue of this circuit, to re-command the deviator panel 20 as previously described, in order to remove those packages not properly separated and return them to the entrance of the installation. Advantageously, the camera 23 is backed up by a second camera 27, likewise joined to the card 24 by a link 28, providing a different image but in the same photographic window, this second image being designed so as to improve the aggregate's discrimination capability and better distinguish the image of the packages within a poorly contrasted environment in the midst of the surrounding noise.

Figure 2:
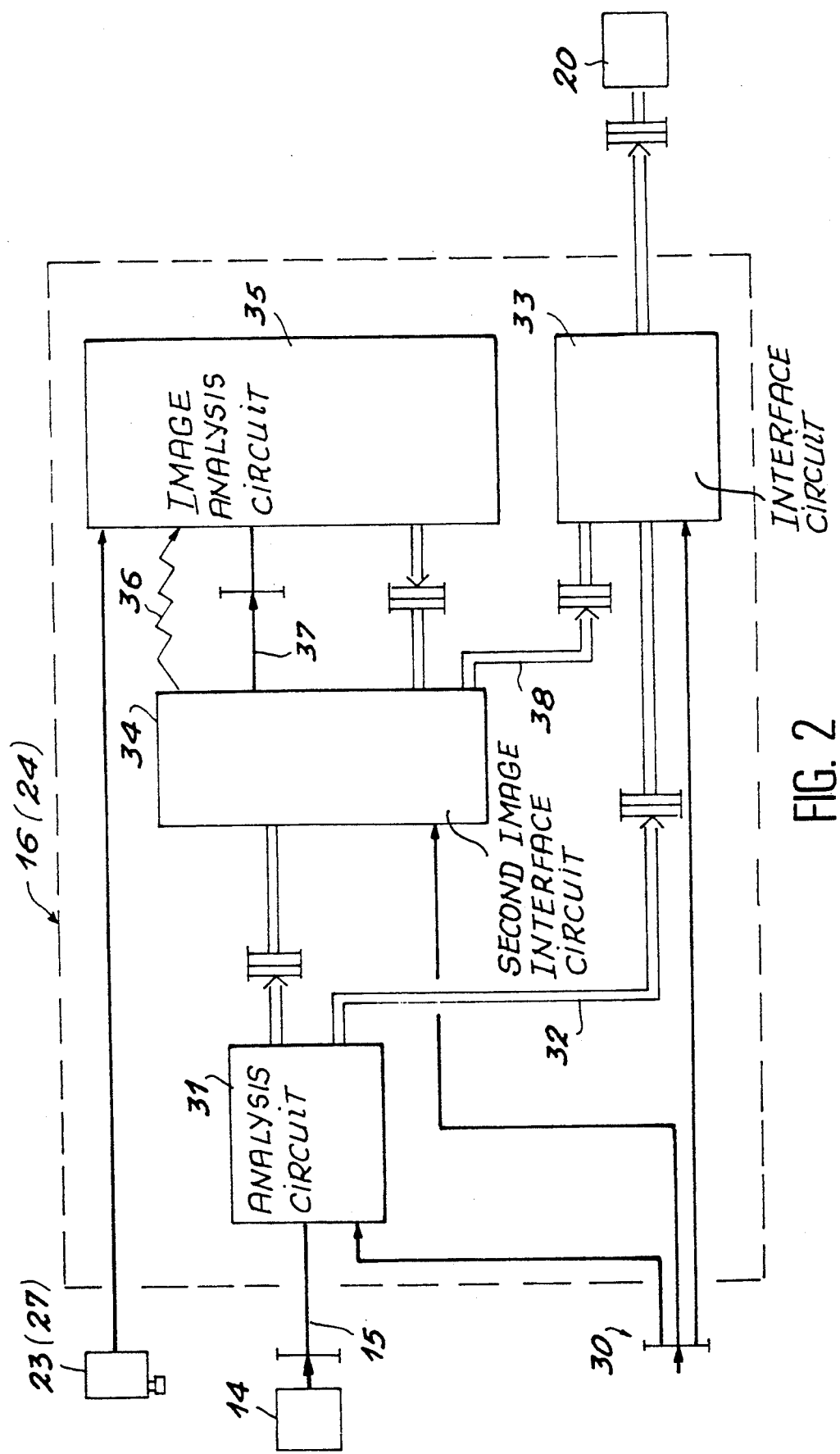
FIG. 2 is a functional diagram of the processing circuit enabling the device's deviator mechanism to be actuated.

FIG. 2 illustrates, on a purely indicative basis, the functional diagram of the circuit 16 and of the card 24 for commanding, from the information received respectively from the cells 12 through the circuit 14 on the one hand and from the video cameras 23 and 27 on the other hand, the deviator panel 20, in combination with a sensor 30, the embodiment of which is in itself of little importance to the invention, supplying a signal dependent on the actual speed of the conveyor belt 10 on which the packages 2 are disposed.

The information originating from the cells 12 is received by an analysis circuit 31 which, via a connection 32 and a sensor (not represented) transmitting signals marking the start and end of each analyzed window, provides an interface circuit 33 with the orders of command for the deviator panel 20 controlling in the specified manner the appropriate spacing, particularly above a determined threshold value, of the successive packages passing with the conveyor into the cells' beam.

Where the separation thus identified is acceptable, the circuit 31 transmits to a second image interface circuit 34 a signal of identification of the analyzed package, simultaneously to information coming from the sensor 30, representing the speed of the conveyor. The video image supplied by the cameras 23 and 27 is then directed by the connections 25 and 28 to an image-analysis circuit 35, which receives a triggering signal via the connection 36 and information on the width of the window via the connection 37.

Within the analysis circuit 35 is effected the succession of previously quoted stages, namely, in sequence, the detection of the contours of packages appearing within the window, the extraction of their silhouette, a polygonal approximation and finally a convexity test on the polygon obtained. The circuit 35 then sends back to the circuit 34 a signal dependent on the results of the completed analysis and, notably, such that the analysis results from the convexity test thus carried out on the digitalized image of the package. The circuit 34 can then, through a connection 38, command the interface circuit 33 and act upon the deviator panel 20, in an identical manner to that previously described, when this panel is commanded by signals coming directly from the barrier of cells 11 via the connection 32.

In this way, a device is realized for controlling and regularizing a flow of packages or similar objects within a sorting installation, notably enabling management of their spacing and, according to this spacing, enabling packages which have not been properly separated to be passed on or conversely removed in order for them to be recycled within the installation. The device can work in real time, the processing circuit being able to analyze around five images per second, which represents a rate greatly superior to that which results from speeds conventionally adopted on conveyor belts which are in use.

Of course, it goes without saying that the invention is not confined to the embodiment example specifically described and represented above; on the contrary, it embraces all variations thereof. More particularly, one might envisage an embodiment in which the function deriving from the use of the barrier of cells determining the spacing of successive packages would be integrated into the function for the image-analysis of these packages through a simple modification to the processing circuit. This would enable, apart from the convexity of the successive silhouettes examined, the relative positioning of these silhouettes to be determined and, more particularly, enabling the management to be ensured of the signals triggering the capturing of each image, depending on the results of the analysis of the preceding image, particularly the distance between the packages. Thanks to the improved integration of the system thus realized, this results in a better processing of these packages, requiring a conveyor of smaller length and consequently offering a lower cost price.

We claim:

1. Device for controlling and regulating spacing of packages positioned to receive the packages from the outlet of a separation apparatus comprising a truncated cone-shaped rotating drum with its axis inclined horizontally and comprising internal helical fins designed to deliver the packages individually to the outlet of the drum, said device comprising a conveyor belt driven at constant speed and onto which the packages are provided from the outlet of the drum, a row of detection cells the collective beam of which extends perpendicularly across a portion of the conveyor for identifying the movement when each of the packages passes into this beam and for measuring, between two successive interruptions of the beam, the relative spacing of two successive packages, at least one video means to provide an image illustrating the distribution in real time of the packages on the conveyor, a processing circuit to process the image supplied by the video means to identify any superimposition of juxtaposition of at least two packages which have escaped detection by the cells, and a mechanism actuated by the processing circuit to remove from the conveyor those packages which are not suitably spaced.

2. Device according to claim 1, wherein said detection cells comprise infrared cells disposed beneath the conveyor belt.

3. Device according to claim 1, wherein said video means comprises a CCD camera for transmitting an analog video signal of an image representing the silhouettes of the packages projected onto the plane of the conveyor, said images being analyzed by said processing circuit.

4. Device according to claim 1, wherein said video means comprises two cameras positioned at different angles relative to the conveyor for improving the device's discrimination capability.

5. Device according to claim 4, wherein said cameras are designed to provide 256×256 digital images, at 8 bits per pixel, from suitably contrasted video images.

6. Device according to claim 1, wherein said processing circuit effects successively from the images of the packages, a contour detection, an extraction of the silhouettes of the packages, a polygonal approximation of each silhouette and a convexity test.

* * * * *